United States Patent [19]

Masclet

[11] 4,087,062
[45] May 2, 1978

[54] AIRCRAFT UNDERCARRIAGE INCLUDING A SAFETY DEVICE HAVING A PREDETERMINED BREAKING LOAD

[75] Inventor: Jean Masclet, Paris, France
[73] Assignee: Messier-Hispano, S.A., Montrouge, France
[21] Appl. No.: 783,548
[22] Filed: Apr. 1, 1977
[30] Foreign Application Priority Data
 Apr. 22, 1976 France .................. 76 11902
[51] Int. Cl.² ............................. B64C 25/08
[52] U.S. Cl. ................... 244/100 R; 244/102 R; 114/279; 115/41 R; 188/1 C
[58] Field of Search ............ 244/100 R, 102 R, 108, 244/109; 188/1 C; 115/41 R; 114/132, 279, 282; 416/2

[56] References Cited
U.S. PATENT DOCUMENTS
1,890,938 12/1932 Fahrney ............... 115/41 R FOREIGN PATENT DOCUMENTS
732,203 1/1943 Germany ............ 244/102 R
1,019,908 2/1966 United Kingdom ...... 244/102 R Primary Examiner—Galen L. Barefoot
Attorney, Agent, or Firm—Scully, Scott, Murphy & Presser

[57] ABSTRACT

An undercarriage for an aircraft has a safety device which fails under a predetermined breaking load to separate a leg member of the undercarriage from a rigid element of the undercarriage, the rigid element remaining on the aircraft. The aircraft has on the frame thereof a front mounting and a rear mounting for mounting the undercarriage and said undercarriage comprises said leg member and said rigid element which is mounted in and extends between said front and rear mountings and forms an axle about the axis of which the leg member of the undercarriage can be pivoted for raising the lowering the undercarriage. Said axle is normally held rigid with said leg member by a front frangible element which fractures under determined stress and a rear frangible element which fractures, under substantially wholly flexion stress, following fracture of the front frangible element, whereby said leg member can separate from the aircraft without coming into contact with elements of the frame of the aircraft when said determined stress is exceeded.

6 Claims, 2 Drawing Figures

AIRCRAFT UNDERCARRIAGE INCLUDING A SAFETY DEVICE HAVING A PREDETERMINED BREAKING LOAD

BACKGROUND OF THE INVENTION

The invention relates to an aircraft undercarriage including a safety device having a predetermined breaking load such that the undercarriage is caused to become detached from the aircraft without damaging the wings or any other essential structural parts thereof, in the event of excessive longitudinal stresses being applied to the bottom part of the landing gear, for example at the level of the wheels.

It is known that an undercarriage can be mounted on the frame of the aircraft by way of an articulated connection which allows the undercarriage to be lowered and retracted. In the case of wing-mounted landing gear there is usually a front connection and a rear connection for the mounting of each undercarriage, such connections generally being provided on the rear spare of the respective wing.

In the event of a landing at excessive speed, or if the aircraft, leaving a runway for some reason, strikes a slope or any other obstacle to the free rolling movement of the undercarriage over the ground, the undercarriage and the part of the frame of the aircraft on which it is mounted are called upon to suffer quite considerable longitudinal stresses which can result in deformation and even fracture of the respective wing spar. This, already serious in itself and probably necessitating considerable repairs to the frame of the aircraft, it likely also to result in rupture of wing fuel tanks, which may result in the aircraft catching fire.

Various international safety regulations stipulate that undercarriages for commercial aircraft must be equipped with safety devices of predetermined breaking load which act as mechanical fuses, so that the undercarriage is capable of giving way under the effect of excessive longitudinal stresses without damaging the frame of the aircraft.

Such safety devices as are already known are generally located and extend at right-angles to the front mounting of the landing gear on the frame of the aircraft and fracture under specific traction and/or shearing stresses, which of course are vastly greater than the stresses likely to arise during normal landing, thereby to remove a direct connection of the undercarriage to the frame, and leaving the undercarriage free to fold back towards the rear of the aircraft.

A major disadvantage of previously proposed devices is that they do not prevent damage or even fracture of a part of the aircraft frame, particularly part of the wings, with the already stated risks which this entails.

SUMMARY OF THE INVENTION

The object which the present invention sets out to achieve is that of providing an undercarriage which does not have the above mentioned drawbacks and which is capable of becoming detached from the aircraft without damaging the frame of the aircraft, and in particular the front and rear mountings by which the undercarriage is mounted on the aircraft.

According to the invention there is provided an undercarriage, for an aircraft having on the frame thereof a front mounting and a rear mounting for mounting the undercarriage, said undercarriage comprising a leg member and a rigid element to be mounted in and to extend between said front and rear mountings to form an axle about the axis of which said leg member of the undercarriage can be pivoted for raising and lowering the undercarriage, said axle being held rigid with said leg member by a front frangible element which will fracture under determined stress and a rear frangible element which will fracture, under substantially wholly flexion stress, following fracture of the front frangible element, whereby, when said determined stress is exceeded, said leg member can separate from the aircraft without coming into contact with elements of the frame of the aircraft, said rigid element remaining in position on the aircraft.

Thus it is the undercarriage which fractures leaving one of its components on the aircraft, rather than the fracture occurring between the undercarriage and the aircraft.

Preferably said front frangible element comprises a shear pin extending through said rigid element and said leg member.

Preferably said rear frangible element comprises a lug rigid with said leg member and having a bore in which a rear cyclindrical portion of said rigid element is engaged, said rigid element to be so disposed that the axis of said rear cylindrical portion lies in a plane which extends substantially longitudinally of the aircraft.

The lug is preferably slidably mounted on said rear cylindrical portion of said rigid element, so that an isostatic system may be constituted, in which the stresses are known at the level of the two frangible elements which can thus be correctly dimensioned.

A stop may be provided at the rear end of said rear cylindrical portion of the rigid element to prevent contact between said lug and said rear mounting during fracture of said lug.

DESCRIPTION OF THE DRAWING

The invention is diagrammatically illustrated by way of example in the accompanying drawing which shows a wing-mounted undercarriage adapted for substantially lateral raising and which may be of large dimensions suitable for example for commercial aircraft.

In the drawing.

DESCRIPTION OF THE PREFERRED EMBODIMENT

Figure 1:
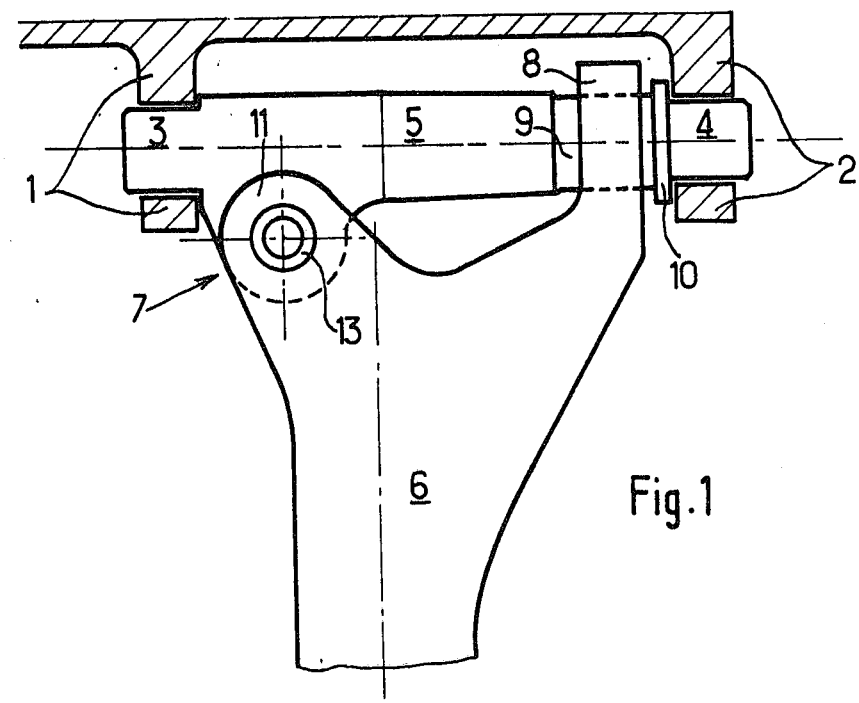
FIG. 1 shows in elevation, the upper part of an undercarriage for an aircraft according to the invention, in its normal configuration, with a part of the wing of the aircraft shown in section on a plane parallel to the axis of symmetry of the aircraft, the front of which aircraft would be situated on the left in the drawing.

Referring to the drawing, the frame of an aircraft wing defines a front mounting 1 and a rear mounting 2 for mounting of the landing gear, the mountings 1 and 2 constituting bearings which respectively receive a front journal portion 3 and a rear journal portion 4 of an axle 5 of an undercarriage, which axle 5 in this example, defines the axis of articulation about which an undercarriage leg member 6 is pivoted for lowering and retraction.

The undercarriage leg member 6 which carries at its lower end at least one wheel and includes a shock absorber and the other means which in per se known manner are included in an undercarriage, is rigidly secured to the axle 5 by means of, at the front, a shear arrangement 7 and, at the rear, a frangible lug 8 of generally cylindrical section, rigid with the leg member 6, and mounted to slide on a rear cylindrical portion 9 of the axle 5. The rear cylindrical portion 9 is separated from the journal portion 4 by an abutment shoulder 10 which can bear against the rear mounting 2 to locate the axle 5 axially in the mountings 1 and 2 and also prevents any contact between the lug 8 and the rear mounting 2 following fracture of the lug 8.

The shear arrangement 7 comprises a flange 11 integral with the leg member 6, a tongue 12 provided on and projecting downwardly from the axle 5 and a transverse shear pin 13 engaged in aligned bores in the flange 11 and the tongue 12 to hold them rigidly together. Preferably the flange 11 is bifurcated to form two flange portions with the tongue 12 engaged therebetween.

Figure 2:
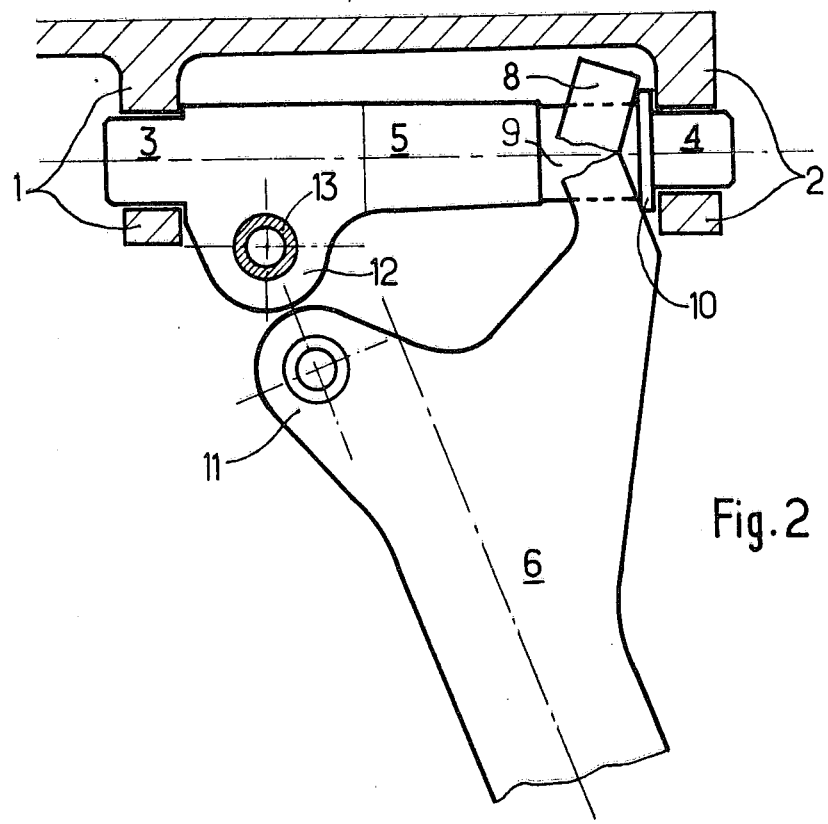
FIG. 2 is a similar view to FIG. 1 taken after fracture of a front frangible element and with a rear frangible element in course of fracture.

The transverse shear pin 13, which in the embodiment shown is of tubular form, constitutes a front frangible element or main mechanical fuse which fractures first when shearing stresses which exceed a predetermined value are applied thereto, as a result of the presence of an obstacle to free rolling movement of the undercarriage over the ground, and the lug 8 constitutes a rear frangible element or secondary mechanical fuse which fractures under flexion as a result of fracture of the front frangible element and consequent rearward and upward pivoting movement of the undercarriage leg member 6, as shown in FIG. 2.

The sliding mounting of the lug 8 on the rear cylindrical portion 9 of the axle 5 makes possible an isostatic system in which the stresses at the level of the two frangible elements are calculable so that it is possible to dimension sufficiently accurately the frangible elements and in particular the front frangible element.

The particular result obtained is that when required, separation takes place no longer between the undercarriage and a part of the frame of the aircraft, but rather between two elements of the undercarriage, one of which remains in its original position on the aircraft.

What is claimed is:

1. In an undercarriage, for an aircraft having on the frame thereof a front mounting and a rear mounting for mounting the undercarriage, a rigid element and a leg member, said rigid element to be mounted in and to extend between said front and rear mountings to form an axle about the axis of which said leg member of the undercarriage can be pivoted for raising and lowering the undercarriage, said axle being held rigid with said leg member by a front frangible element which will fracture under determined stress and a rear frangible element which will fracture, under substantially wholly flexion stress, following fracture of the front frangible element, whereby when said determined stress is exceeded, said leg member can separate from the aircraft without coming into contact with elements of the frame of the aircraft, said rigid element remaining in position on the aircraft.

2. The invention as claimed in claim 1, wherein said front frangible element comprises a shear pin extending through said rigid element and said leg member.

3. In an undercarriage, for an aircraft having on the frame thereof a front mounting and a rear mounting for mounting the undercarriage, a rigid element and a leg member, said rigid element to be mounted in and to extend between said front and rear mountings to form an axle about the axis of which said leg member of the undercarriage can be pivoted for raising and lowering the undercarriage, said axle being held rigid with said leg member by a front frangible element which will fracture under determined stress and a rear frangible element which will fracture, under substantially wholly flexion stress, following fracture of the front frangible element, said rear frangible element comprises a lug rigid with said leg member and having a bore in which a rear cylindrical portion of said rigid element is engaged, said rigid element to be so disposed that the axis of said rear cylindrical portion lies in a plane which extends substantially longitudinally of the aircraft, whereby when said determined stress is exceeded, said leg member can separate from the aircraft without coming into contact with elements of the frame of the aircraft, said rigid element remaining in position on the aircraft.

4. The invention as claimed in claim 3, wherein said front frangible element comprises a shear pin extending through said rigid element and said leg member.

5. The invention as claimed in claim 3, wherein said lug is slidably mounted on said rear cylindrical portion of said rigid element.

6. The invention as claimed in claim 3, further comprising a stop at the rear end of said rear cylindrical portion of the rigid element to prevent contact between said lug and said rear mounting during fracture of said lug.

* * * * *